Patented Sept. 23, 1924.

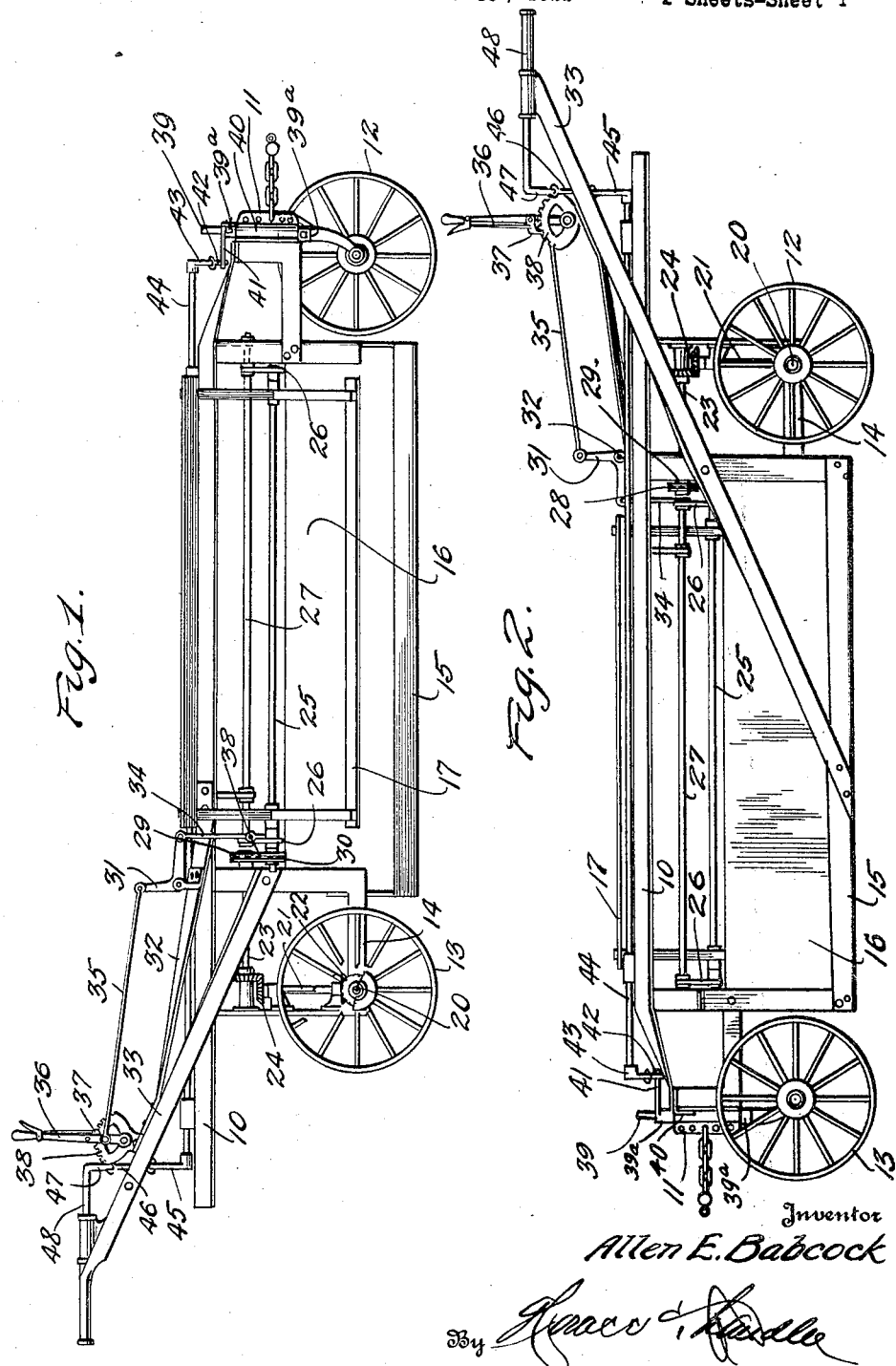

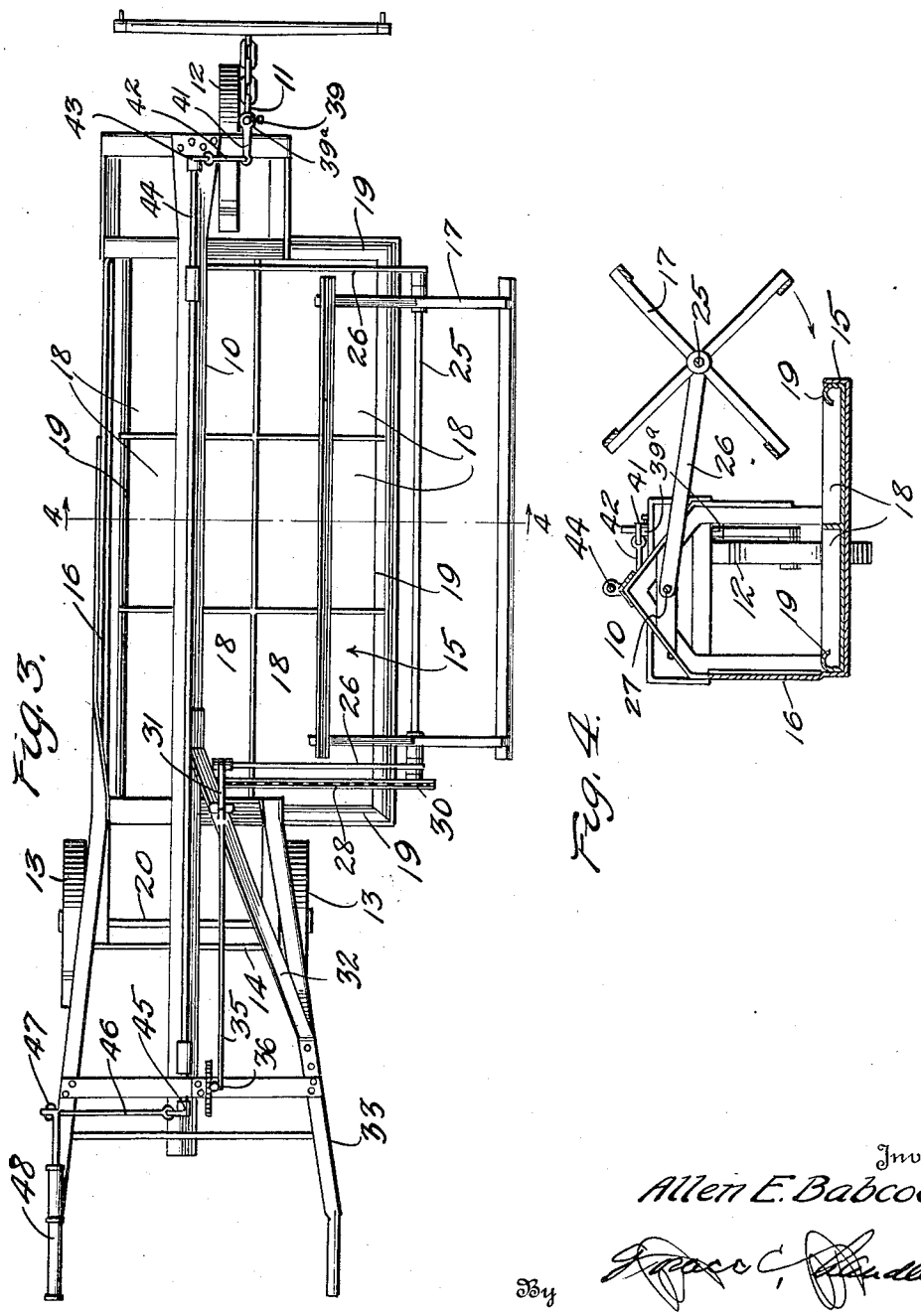

1,509,093

UNITED STATES PATENT OFFICE.

ALLEN EARL BABCOCK, OF EXELAND, WISCONSIN.

INSECT-DESTROYING MACHINE.

Application filed June 13, 1922. Serial No. 567,937.

*To all whom it may concern:*

Be it known that I, ALLEN EARL BABCOCK, a citizen of the United States, residing at Exeland, in the county of Sawyer, State of Wisconsin, have invented certain new and useful Improvements in Insect-Destroying Machines; and I do hereby declare the following to be a full, clear, and exact description of the invention, such as will enable others skilled in the art to which it appertains to make and use the same.

The object of the invention is to provide a machine for removing destructive insects and worms from growing plants particularly when arranged in rows or stands and more particularly for removing potato bugs and those insects known as green hoppers and the like which feed on the under side of the leaf, and which are difficult of access for any effective purpose by the application of poison; and especially to provide a mechanical means for detaching the insects from the plants under such conditions as to deposit them in a receptacle having means for effecting the destruction thereof as a poison liquid; and with these general objects in view, the invention consists in a construction, combination and arrangement of parts of which a preferred embodiment is shown in the accompanying drawings, wherein:

Figures 1 and 2 are opposite side views and Figure 3 is a plan view of a machine embodying the invention.

Figure 4 is a transverse sectional view on the line 4—4 of Figure 3.

The mechanism embodies essentially a longitudinal beam 10, which for convenience may be termed a draft beam in that it is adapted by reason of the provision at its forward end of the clevis 11 for the attachment of suitable draft mechanism adaptable to a horse or similar animal, said beam being supported at its front and rear ends by wheels 12 and 13, of which the former is designed for use in steering or guiding the machine, while the latter, employed in duplicate, serve to sustain the major portion of the weight of the mechanism and are mounted on a hanger 14, depending from the draft beam. To prevent lodgement of the insects on this beam it is preferably of cross-sectionally V-shaped inverted to present upwardly directed inclined surfaces.

Also suspended from the draft beam in advance of the rear or main wheels 13, is a substantially rectangular stationary pan 15, at one side of which is arranged a guard 16 consisting of an upward extension of the side wall of the pan, and at the other side of which is arranged a reel 17 adapted for rotary movement for the purpose of agitation or vibrating the plants and brushing the insects from the leaves and limbs thereof toward the pan for exposure to the poisonous liquid of any suitable character which may be used in connection therewith. A second pan 49 is removably positioned within the stationary pan 15 and the interior of the removable pan is preferably subdivided into compartments 18 to minimize the liquid contents thereof to splash or flow from one end to the other or from one side to the other in such a way as to escape, and in addition thereto the edges of the side and end walls are provided with inwardly directed deflectors 19 which not only assist in minimizing the tendency of the liquid to escape but serve to prevent insects which are not restrained by the liquid contents of the pan from crawling out of the same and escaping.

The wheels of the mechanism are carried by a transverse axle shaft 20 from which rotary movement is communicated through a connecting shaft 21 suitably geared thereto as indicated at 22 to a countershaft 23 through intermeshing gears 24, and the spindle 25 of the reel is mounted in swinging arms 26 fulcrumed upon a pivot rod 27 which is in axial alignment with said countershaft, so that connection may be made by means of a sprocket chain or belt 28 between pulleys 29 and 30, secured respectively to said countershaft and reel for communicating motion to the reel regardless of its position and hence regardless of the elevation of the reel, which is adapted to be adjusted to suit the height of the plants upon which the machine is operating in accordance with the judgment of the operator.

The means for controlling the elevation of the reel consists in the construction illustrated of a bell-crank lever 31, mounted upon a suitable brace 32 connecting the tongue with one of the handles 33 and having one of its arms connected by a link 34 with one of the swinging reel supporting arms,—said bell-crank lever being connected by a suitable link 35 with a hand lever 36 provided with a latch 37 traversing a toothed segment 38, to the end that the hand lever and the reel supporting means may be locked in any desired adjusted position.

To the end that the front wheel may be utilized as means for directing the path of the machine, it is provided with a vertical spindle 39 mounted in a suitable upright bearing 40 and connected by a crank-arm 41 and link 42 to a crank 43 on the rock shaft 44, which extends longitudinally of the beam 10 and is provided at its rear end with a crank arm 45 having a link connection 46 with a crank arm 47 on a hand rocker 48, mounted upon and serving essentially as a grip for one of the handles intended to be grasped by the operator in the directing of the machine, with a view to securing a proper action of the reel upon a row of plants.

It will be understood that the spindle 39 of the front or lead wheel 12 may be adjusted with relation to the frame to the bearing of the front end thereof and with this object in view if fitted with upper and lower collars 39ª which may be locked to the spindle by set screws of any other equivalent means, said collars serving to bear against the corresponding ends of the sleeve bearing 40 in which the spindle operates.

In the operation of the machine as it is being drawn along between the rows of plants, rotary movement is communicated to the countershaft 23 through the connecting shaft 21, which has a gear on its lower end engaging with a gear on the rotating rear axle 20, and another gear on its upper end engaging a gear on the end of the countershaft. The chain 28 passes around the sprocket wheels carried by the counter shaft and the reel so that as the countershaft rotates, motion will be communicated to the reel 27 which will knock the insects from the plants into the pan 15. The reel is raised or lowered through the medium of the links 34 and 35, the belt crank 31 and the lever 36, the arms of the reel being pivotally secured to the pivot rod 27, which is arranged beneath the longitudinal draft beam 10.

What is claimed is:

1. In a machine for the purpose indicated, the combination with a central, longitudinal, wheel supported draft beam of substantially inverted V-shape in cross section, of a pivot rod extending longitudinally of and supported beneath the said beam, arms pivotally secured to said rod a reel carried by the arms, a counter shaft supported beneath the beam in aligned position to the rod, means for operating the counter shaft, and operative connections between the said counter shaft and reel.

2. In a machine for the purpose indicated, the combination with a central, longitudinal, wheel supported draft beam of substantially inverted V-shape in cross section, of a pivot rod extending longitudinally of and supported beneath the beam, arms pivotally secured to the said rod, a reel carried by the arms, one of the ends of the spindle of the reel extending beyond the adjacent arm, a counter shaft supported beneath the beam in aligned position to the rod, means for operating the counter shaft, sprocket wheels carried by the counter shaft and the extended end of the spindle, and a sprocket chain engaging said wheels.

3. In a machine for the purpose indicated, the combination with a central, longitudinal, wheel supported draft beam of substantially inverted V-shape in cross section, of a pivot rod extending longitudinally of and supported beneath the said beam, arms pivotally secured to said rod, a reel carried by the arms, a counter shaft supported beneath the beam in aligned position to the rod, means for operating the counter shaft, operative connections between the said counter shaft and reel, and means for raising and lowering the said reel, said means comprising a bell crank carried by the frame, a hand lever carried by the frame, a link connected to one end of the bell crank and the adjacent arm, and a second link connected to the other end of the bell crank and to the hand lever.

4. A machine for the purpose indicated including a wheel supported central longitudinal draft beam, a pivot rod extending longitudinally of and supported beneath the said beam, arms connected to said rod, a reel carried by the arms, a counter shaft supported beneath the beam in aligned position to the rod, means for operating said counter shaft, and means for operating the said reel.

In testimony whereof, I affix my signature, in the presence of two witnesses.

ALLEN EARL BABCOCK.

Witnesses:
G. O. CHRISTENSEN,
A. A. VENESS.